United States Patent
Monroe et al.

(10) Patent No.: US 6,310,632 B1
(45) Date of Patent: *Oct. 30, 2001

(54) SYSTEM AND METHOD FOR A GRAPHICAL USER INTERFACE INCLUDING BUDDY DIALOGS

(75) Inventors: Tod A. Monroe, Endicott; Eric A. Weinmann, Owego, both of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,124

(22) Filed: Oct. 19, 1998

(51) Int. Cl.[7] .................................................. G09G 5/00
(52) U.S. Cl. ......................... 345/808; 345/765; 345/781; 345/777
(58) Field of Search ..................................... 345/347, 348, 345/336, 340, 334, 357, 343, 353

(56) References Cited

U.S. PATENT DOCUMENTS

| | | | |
|---|---|---|---|
| 5,325,481 | * | 6/1994 | Hunt ........................................ 345/347 |
| 5,339,392 | | 8/1994 | Risberg et al. ....................... 395/161 |
| 5,596,702 | | 1/1997 | Stucka et al. ........................ 395/340 |
| 5,608,860 | | 3/1997 | Figzpatrick et al. ................. 395/352 |
| 5,651,108 | | 7/1997 | Cain et al. ............................. 395/340 |
| 5,664,127 | | 9/1997 | Anderson et al. .................... 345/333 |
| 5,671,378 | | 9/1997 | Acker et al. .......................... 395/334 |
| 5,673,404 | | 9/1997 | Cousins et al. ....................... 395/347 |
| 5,721,847 | | 2/1998 | Johnson ................................ 395/333 |
| 5,732,402 | * | 3/1998 | Lehman ................................. 707/205 |
| 5,751,980 | * | 5/1998 | Musashi et al. ...................... 345/354 |
| 5,870,088 | * | 2/1999 | Washington et al. ................ 345/326 |
| 5,874,958 | * | 2/1999 | Ludolph ................................ 345/339 |
| 5,983,234 | * | 11/1999 | Tietjen et al. ........................ 707/103 |

OTHER PUBLICATIONS

John D. Ruley, "Networking Windows NT 4.0 Workstation and Server", Installing and Configuring TCP/IP, pp. 275–282, Feb. 1997.*

D. Hamilton, "Programming Windows NT 4 Unleashed", iTKKOWLEDGE.COM, pp. 1–4, Aug. 1996.*

S. B. Gest. "Menu Items Representing Multiple Choice Selections", *IBM Technical Disclosure Bulletin*, vol. 40, No. 7, Jul. 1997, pp. 169–170.

T. L. Jones, et al. "Direct Manipulation Control for Graphic Selection within a Dialog", *IBM Technical Disclousre Bulletin*, vo. 38, No. 3, Mar. 1995, p. 543.

* cited by examiner

Primary Examiner—Raymond J. Bayerl
Assistant Examiner—Tadesse Hailu
(74) Attorney, Agent, or Firm—Shelley M. Beckstrand

(57) ABSTRACT

A graphical user interface includes a buddy dialog which dynamically becomes part of a current dialog upon selection of a selectable object on a property page. A unique buddy dialog format is provided for each of a plurality of data formats for selectable options, or objects, displayed on the property page. The user may see the values for each of several associated options by clicking (or otherwise selecting) on each option successively. Each time an option is selected, its data values appear in its corresponding buddy dialog without popping up another dialog.

17 Claims, 4 Drawing Sheets

SYSTEM AND METHOD FOR A GRAPHICAL USER INTERFACE INCLUDING BUDDY DIALOGS

BACKGROUND OF THE INVENTION

1. Technical Field of the Invention

This invention relates to Graphical User Interfaces (GUI). More specifically, it relates to a GUI which provides a buddy dialog for each possible option format to facilitate editing of data values.

2. Background Art

Graphical user interfaces (GUIs), such as those provided by the Apple Macintosh, Windows™ and OS/2™ operating environments, is a display format which enables a user to choose commands, execute application programs, manage computer files, and perform other functions by selecting pictorial representations known as icons, or items from a menu through use of a pointing device such as a mouse.

Most popular GUI environments present application, system status, and other information to the user in "windows" appearing on a computer monitor screen. A window is a more or less rectangular area within a display screen in which a user views an application or a document. Such a window may be open, closed, displayed full screen, reduced to an icon, increased or reduced in size, or moved to different areas of the display. Multiple windows may be displayed simultaneously, such as: windows included within other windows, windows overlapping other windows, or windows tiled within the display area.

A windows application is a software application program that operates within a Windows operating environment. These windows applications are displayed in a similar manner within an application window and generally follow similar conventions for the arrangement of menus, style of dialog boxes, and use of the keyboard and mouse. The name of an application and any associated document, and a menu bar for the application are typically displayed at the top of the application window which contains the running application.

Within an application window, additional windows or panes may also be displayed. One such window, a dialog box, is displayed to request information from the user or to supply information to the user. In many applications, a user typically is required to edit the data values of many individual objects with different value formats. For example, some of the object values may be IP addresses, others may be time periods, and still others may be more complex such as ordered lists of IP addresses. A GUI may constructed to list the objects in some sort of list control, and the user allowed to select one for editing by, for example, clicking on an icon, tag or edit button. Upon selecting an object for viewing or editing, the user is presented with a separate dialog with the appropriate type of fields for that particular type of object. One specific kind of dialog box is referred to as a pop-up dialog, and is often or typically used to provide a user a way to edit the data values of many individual objects with different value formats.

A problem with the use of pop-up dialogs for configuring objects at a Graphical User Interface (GUI) is that the separate dialog clutters the screen and may hide some valuable related information on the dialogs behind it. Also, popping up a separate dialog to edit each object may be distracting to the user. Furthermore, it is even more annoying to the user if it is only desired to view the value of some object, and this editing method is the only way to view the values. A specific example of the problem with using pop-up dialogs for configuring objects is the configuring of options of the global, subnet, class, and client objects in a Dynamic Host Configuration Protocol (DHCP) server. There are up to 255 different option objects for each global, subnet, class, and client object and there are, for this example, at least ten different data formats used to represent the data values of the option objects.

For example, when a user modifies the properties of a subnet, one of the property pages displayed contains a list of the options that are currently associated with the subnet. As the user selects an option from the list, the option data values need to be presented. The user should also have the capability to modify these values. Since there are potentially many options, popping up a dialog for each one is not a good solution.

It is an object of the invention to provide an improved graphical user interface for enabling a user to configure objects.

It is a further object of the invention to provide user-interface developers, such as server configuration tool developers, the capability to provide users with an improved GUI enabling a user to view and edit values of objects with different value formats.

It is a further object of the invention to provide an improved GUI which enables object configuration without relying solely on the use of pop-up dialogs.

It is a further object of the invention to provide an object configuration GUI in which no extra dialogs appear to distract the user, hide information, and possibly require user interaction to close.

It is a further object of the invention to provide an improved GUI which allows a user to quickly view current settings of a collection of objects with different formats.

SUMMARY OF THE INVENTION

In accordance with the invention, a user interface is provided with a buddy dialog. Data values for individual objects with different value formats are provided with a buddy dialog. As a user selects an object from a list of objects, a corresponding buddy dialog including data values which may be manipulated by the user is added to the property page and dynamically becomes part of the current dialog.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiment of the invention, a graphical user interface is provided for viewing and configuring object values through the use of buddy dialogs. A buddy dialog is provided for each of a plurality of possible option, or object, formats. As a user selects an object from a list of objects, a corresponding buddy dialog including data values which may be manipulated by the user is added to the property page and dynamically becomes part of the current dialog.

A buddy dialog, unlike a pop-up dialog, dynamically becomes part of the current dialog. By "dynamically" is meant that the dialog is changed through code while the program is running, as will be further explained hereafter in connection with the Tables. A current dialog is the window that currently has focus. By way of example in connection with the preferred embodiment of the invention described hereafter, it is the options property page which is in focus and, therefore, with which the user is interacting. As the user selects an option from a list in the current dialog, the corresponding buddy dialog is added to the bottom of the options property page of, for example, a subnet property sheet. Thus, a buddy dialog is a dialog which occupies a reserved area within an options or similar property page or window, and upon selection of an option within either the available options list or selected options list dynamically becomes part of the current dialog. Such buddy dialogs are used for displaying and editing the values of selected objects, a plurality of which objects have different formats, on the same dialog. A property page is a page with a tab within a property sheet. As distinguished from a pop-up dialog, part of a buddy dialog changes as each option is selected; that is, the code (see the Tables, infra), and not the user, determines what to display in the buddy dialog based on the type of object that the user selects, with all of this occurring on one page and without the appearance of separate pop-up dialogs.

For example, if the routers option is selected, a buddy dialog is added to the bottom of the property page which contains a list control of the IP addresses, and add, remove, move-up, and move-down buttons, respectively for adding, removing and arranging IP addresses within the list displayed in the buddy dialog. If the user wants to make a change, the data values in the buddy dialog may be manipulated. When the user selects a different option object, the changes made to the previous option's data values, if any, are saved, and the buddy dialog is replaced with the appropriate buddy dialog for the newly selected option. Additionally, the user may see the values for each of several associated options by clicking (or otherwise selecting) on each option successively. Each time an option is selected, its value appears in its corresponding buddy dialog without popping up another dialog.

Figure 1:
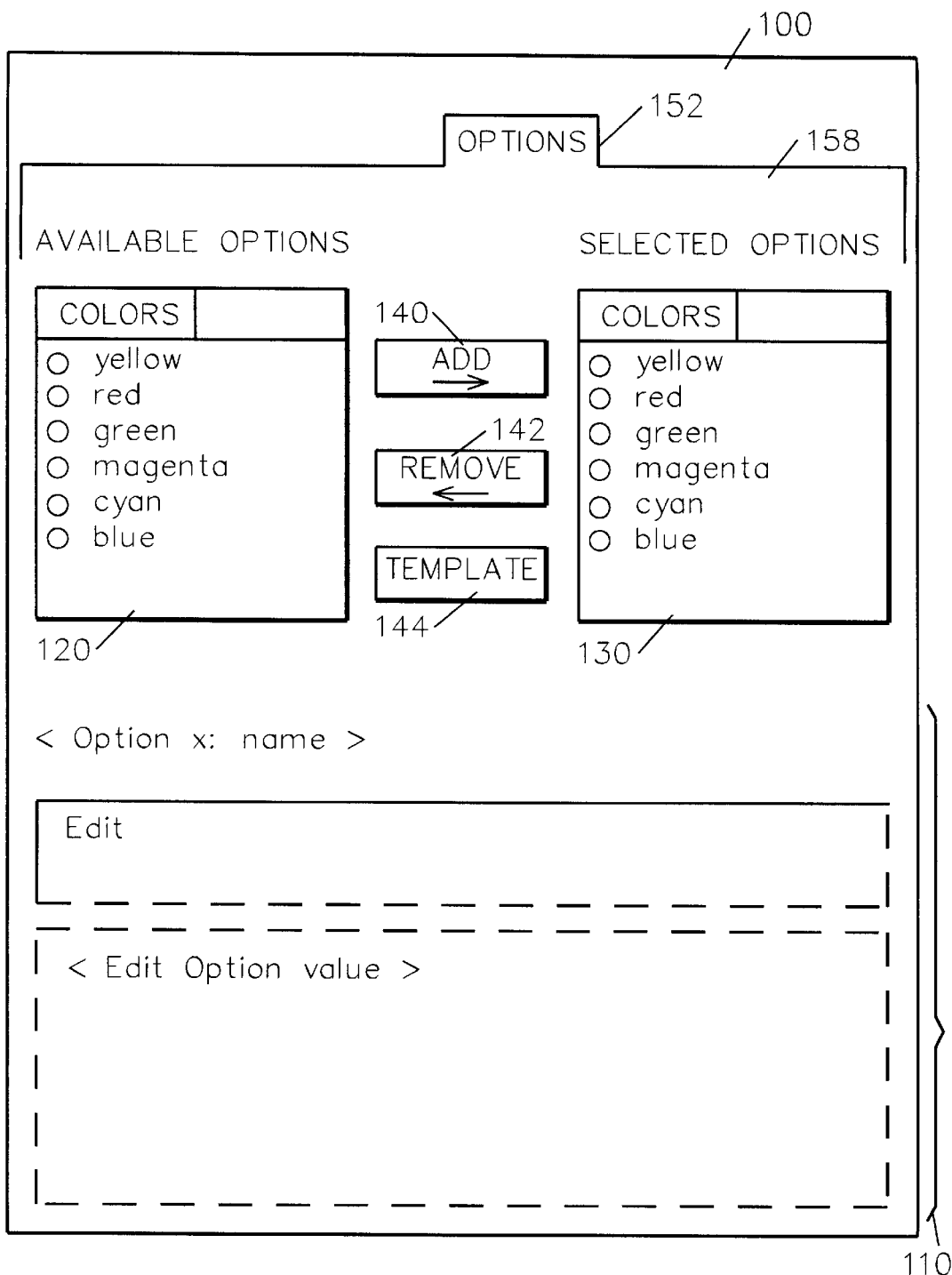
FIG. 1 illustrates an empty view of options page, including a group box component for receiving a buddy dialog.

Referring to FIG. 1, an empty view of options page 158 overlies group box area 100. Included within empty view of options page 158 are available options panel 120, selected options panel 130, control buttons 140, 142 and 144. Group box component 110 outlines a reserved area for buddy dialogs, including a description component 131 and edit component 133. Add button 140 used to move an object selected from available options panel 120 to selected options panel 130, and remove button 142 moves an object selected from selected options panel 130 to available options panel 120.

Figure 2:
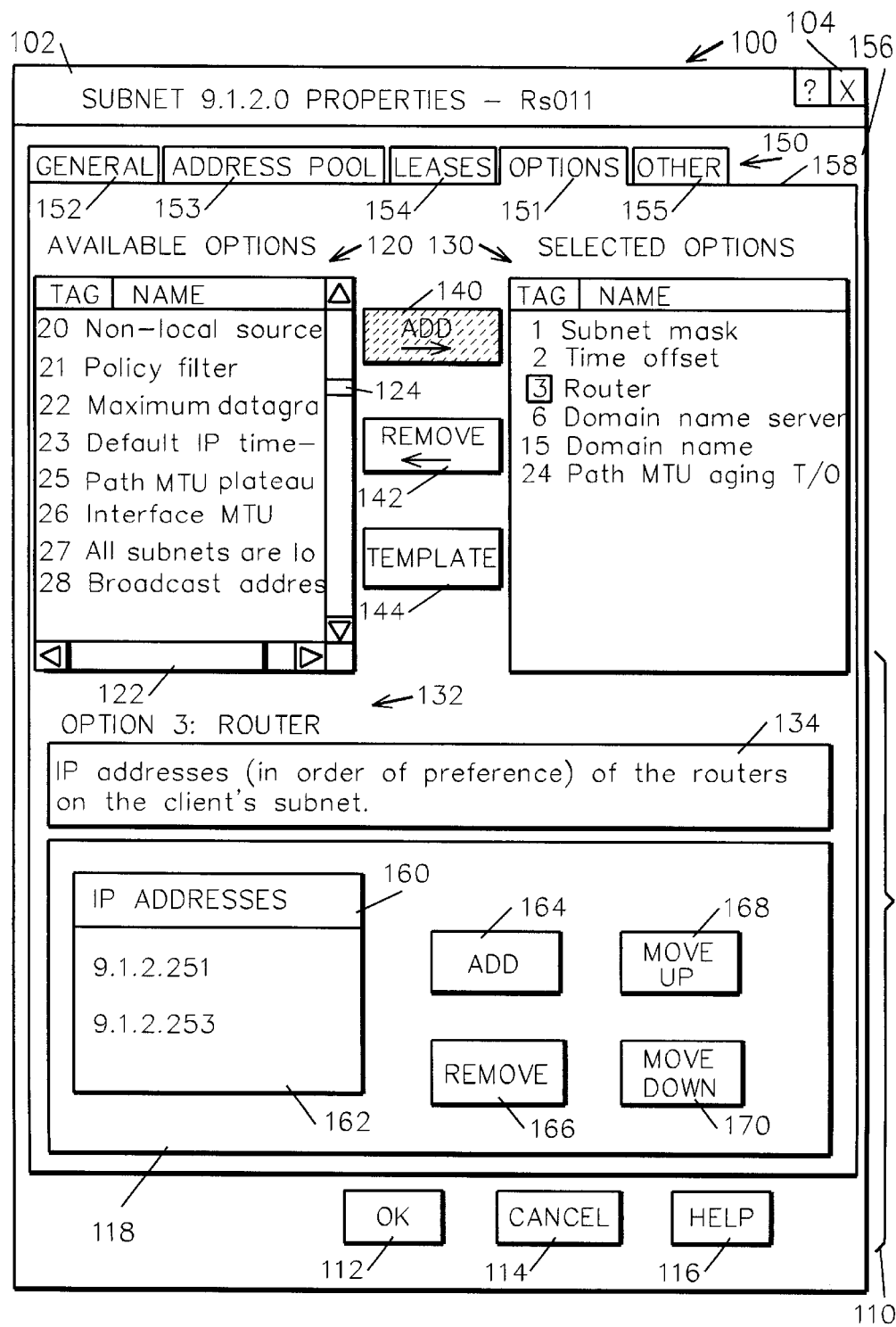
FIG. 2 illustrates a buddy dialog in accordance with the preferred embodiment of the invention which, in this example, allows an administrator to view or change the values of DHCP options of an ordered IP address data type.

Referring to FIG. 2, in accordance with a specific embodiment of the invention for a DHCP configuration GUI, buddy dialogs allow the administrator to view or change the values of DHCP options. In this embodiment, there may be over 80 options to view or edit, and the options may have, for example, 12 different data types. Buddy dialogs make it easier for the administrator to set or change the values of these options without launching a secondary dialog, such as a pop-up dialog, for each such option.

A property sheet may contain a plurality of property pages, or panels, with a selection tab for each property page. Subnet property sheet 156, including title area 102, contains several property page selection tabs 150, including general property page selection tab 152, address pool property page selection tab 153, leases property page selection tab 152, options property page 158 selection tab 151, and other property page selection tab 155. In this specific example, selection of selection tab 151 brings up options property page 158 including a buddy dialog in reserved area 110. Property sheet 156 also includes OK button 112, cancel button 114, and help button 116. Options page 158 includes available options panel 120 which, as is here illustrated, displays a list of objects which exceeds the available view space. Consequently, paging buttons 124 appear for paging through the available options panel. As here illustrated, several objects (objects 1, 2, 3, 6, 14 and 24) have been selected in options panel 120 and transferred to selected options panel 130. OK button 112, in this example, refers to the entire page 158, including the contents of the included buddy dialog. This distinguishes the OK button on a pop-up dialog which is active only with respect to the content of the pop-up dialog. Typical pop-up dialogs also include an edit button, which must be activated before editing of data values is permitted within the pop-up dialog. In the case of the buddy dialog of the present invention, no such edit button is required and a data object within the buddy dialog may be edited by selecting it.

An options property page 158 may be built using an editor, such as the Microsoft Resource Editor. Herein, options property page 158 includes two list components 120 and 130 for option selection and a reserved area 110 for displaying buddy dialogs. A group box component may be used to reserve area 110 on property page 158. Each of the types of buddy dialogs may be created as form views in the Microsoft Resource Editor. FIG. 1 shows a buddy dialog as a form view 131, 133 in the Microsoft Resource Editor. Selectable components may also be displayed in a hierarchal structure, rather than as a list as illustrated, in which case a buddy dialog may be displayed with respect to components selected (for example, by highlighting) within the hierarchal structure. In accordance with the invention, property pages and dialogs are treated alike, and the term property page may be used here to refer to both. That is, a buddy dialog may be put on any property page (a page with a tab) or dialog (a window which does not have a tab, such as, for example, a pop-up window!)

Referring further to FIG. 2, a buddy dialog 132, 134, 118 associated with an option that requires an ordered list of IP addresses is illustrated. An example of such an option is router option 3, which is illustrated as selected in selected options panel 130. (Inasmuch as an option in selection options panel 130 is selected, add button 140 is greyed out, or inoperable.) Such a buddy dialog includes option title 132, option description 134, addresses panel 160, 162, add button 164, remove button 166, move up button 168, move down button 170. A user may select add button 164, which results in a highlighted area being added to edit panel 162 into which the user may type a new IP address. A user may select an IP address in edit panel 162, and then activate the remove button 166 to remove the selected IP address from the list in edit panel 162, move up 168 button to move the selected IP address up in the list in edit panel 162, or move down button 170 to move the selected IP address down in the list in edit panel 162.

Figure 3:
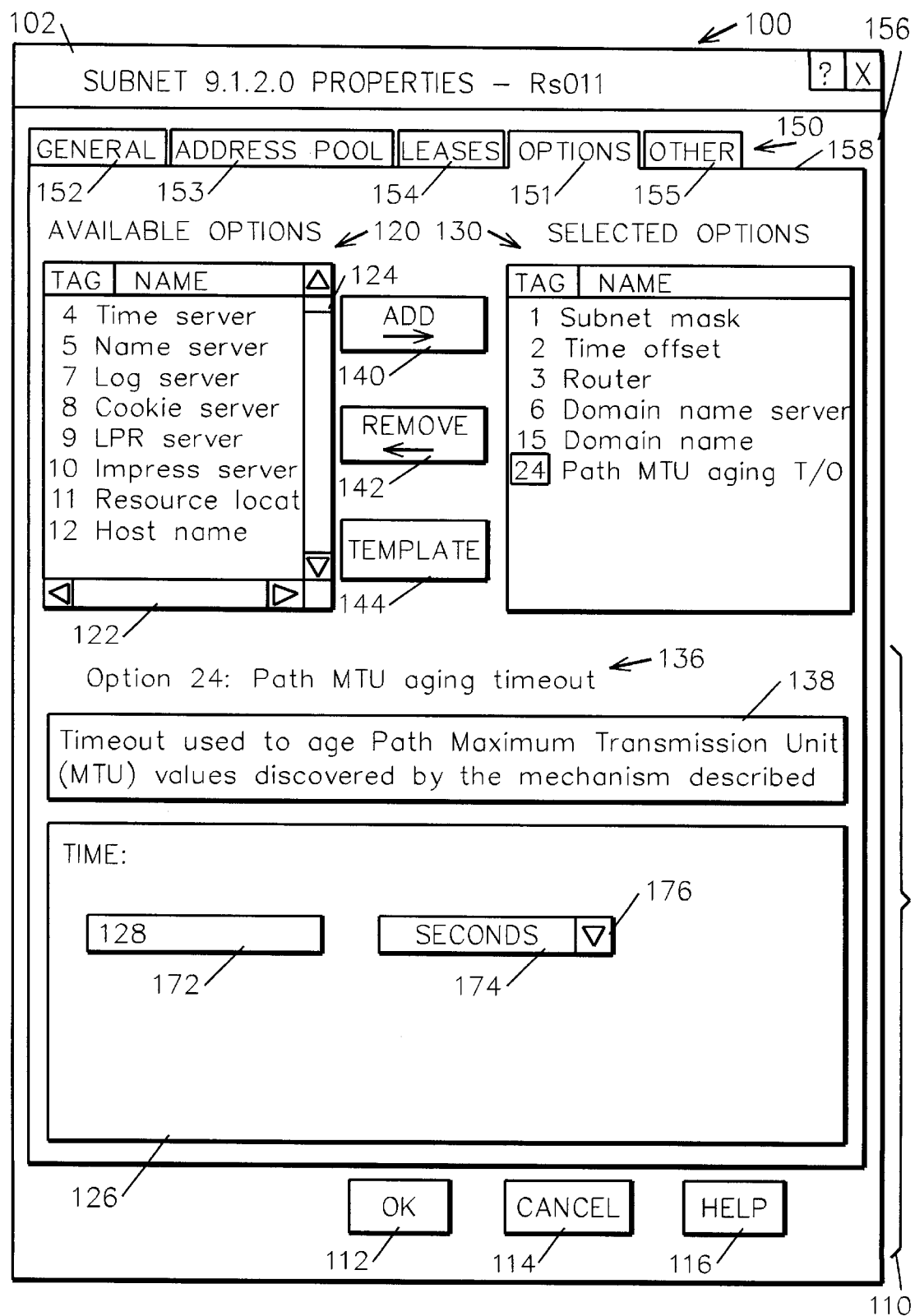
FIG. 3 illustrates a buddy dialog in accordance with the preferred embodiment of the invention which, in this example, allows an administrator to view or change the values of DHCP options of a time value data type.

Referring to FIG. 3, an option page 158 is shown which includes a buddy dialog 136, 138, 118 associated with an option 24 that requires a time value, as is shown in edit panels 172, 174, 176.

Table 1 is a pseudo code representation, in C++ like syntax, of the program for managing options property page 158. Table 2 is a pseudo code representation, in C++ like syntax, of the program for managing buddy dialog 118. Table 3 is a pseudo code representation, in C++ like syntax, of the program for managing buddy dialog 126.

Figure 4:
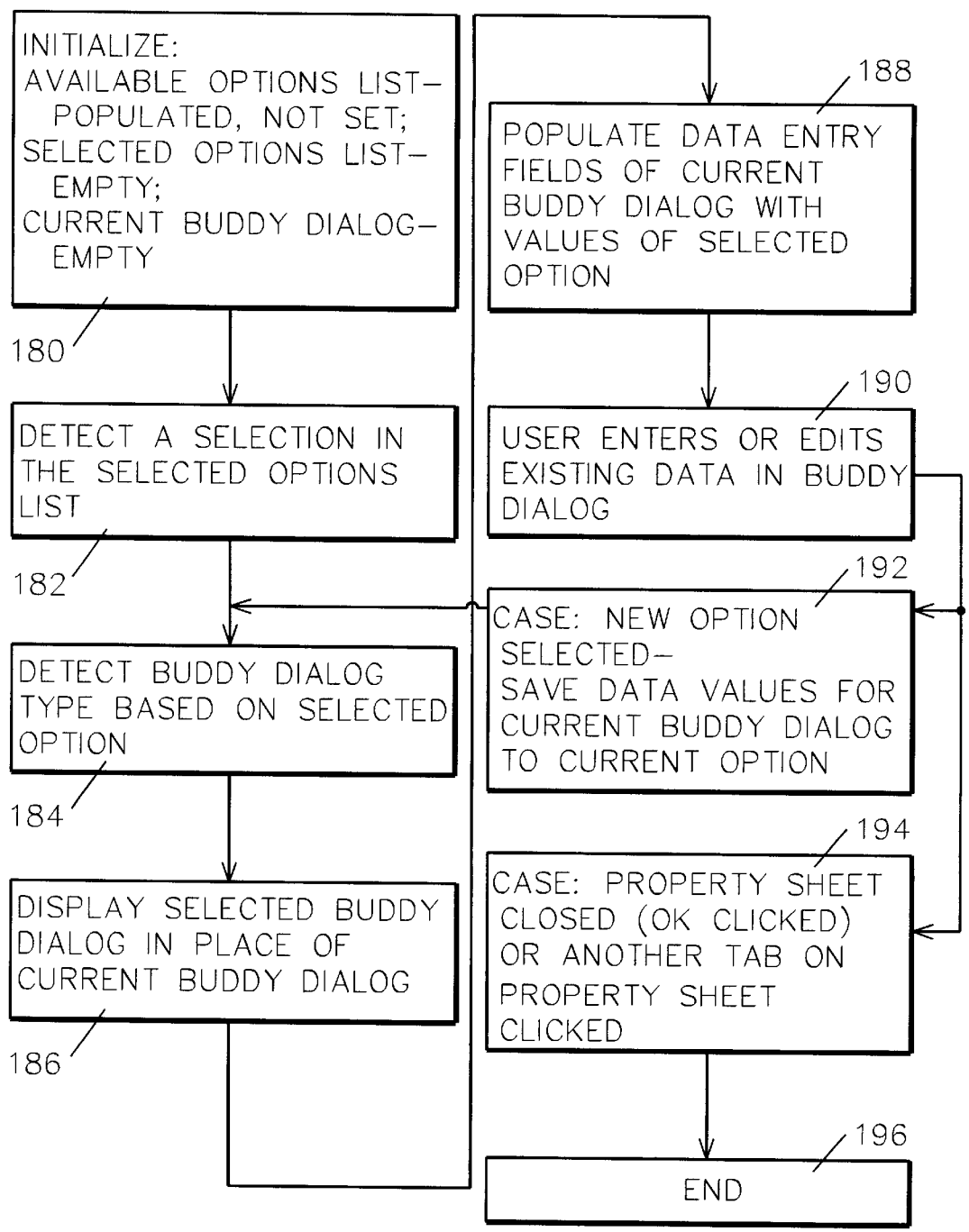
FIG. 4 illustrates the method steps executed in accordance with the preferred embodiment of the invention by the code of Tables 1–3 for managing a property page and its included buddy dialog.

Referring now to FIG. 4, in operation, in step 180 the initialization code for subnet options page 158 creates an empty view (FIG. 1) which overlays groupbox area 100. Available options list 120 and selected options list 130 are populated with appropriate lists of options. Initially, available options list 120 includes objects not currently set, or selected, for the subnet. Buddy dialog view area 110 is empty, as no options, or objects, are selected in either list 120 or 130 by default. In accordance with the preferred embodiment of the invention, step 180 is implemented by Table 1, lines 134–135 (available options), 138–139 (selected options) and 206 (buddy dialog edit box set empty).

In step 182, the code detects that the user has selected an option from list 120. This may be done, for example, by highlighting an object in list 120 and clicking add button 140. In accordance with the preferred embodiment of the invention, step 182 is implemented by Table 1, lines 643–717.

In step 184, the type of buddy dialog to display is determined based on the data type of the selected option. For example, if the data type is the data type of IP addresses, the buddy dialog 118 of FIG. 2 is selected; and if the data types if that of elapsed time, the buddy dialog 118 of FIG. 3 is selected, and so forth. In accordance with the preferred embodiment of the invention, step 184 is implemented by Table 1, lines 512–580. The buddy dialog to display is based on the data format of the option selected from list 130. If an option is selected which requires an ordered list of IP addresses, this is detected at lines 551–555, which will in a later step result in display of a buddy dialog of the format of buddy dialog 118 (FIG. 2). If an option is selected which requires a time value, this is detected at lines 556–559, resulting in display in a later step of a buddy dialog of the format of buddy dialog 126 (FIG. 3). Many other buddy dialog formats may be provided for different data object formats. Those represented in FIGS. 2 and 3 are merely illustrative.

In step 186, the buddy dialog 118 selected in step 184 is displayed in reserved area 110, replacing any previously displayed buddy dialog. In accordance with the preferred embodiment of the invention, step 186 is implemented by Table 1, lines 594–612. That is, create step at line 605 puts the selected buddy dialog on option page 158 in the area 110 defined by m_butEditGroupBox (line 598).

If, in step 182, an object is selected from selected options list 130, in step 188 the fields in buddy dialog 118 are filled in with the selected option's current values. For example, referring to FIG. 2, if router option 3 is selected from selected options list 130, then IP addresses 9.1.2.251 and 9.1.2.253 are retrieved from the router option object and displayed in edit area 162. (For this example, the option object is a structure in memory in which the IP addresses for the router option are stored.) In accordance with the preferred embodiment of the invention, step 182 is implemented by line 622 of Table 1 and by Table 2 for buddy dialog 118 (FIG. 2) and by Table 3 for buddy dialog 126 (FIG. 3). At line 622, the object m_pFrameWnd→GetView( ) is the buddy dialog, and SetOption(pOption,pTemplate) passes the data object for the buddy dialog so that its values can be displayed. If the user had selected object "3 Router" from selected options list 130, then there will be displayed in edit box 162 the IP address values returned by poption. In this case, the class code is identified at lines 551–555 (more specifically, line 554). In the case of buddy dialog 126, the class code is identified at lines 556–559 (more specifically, line 558.) At Table 1 lines 729 through 740, the code determines which item is selected from list 130, and line 752 makes the buddy dialog empty if nothing is selected; thereupon, processing returns to line 512.

In step 190, the user enters or edits existing data in the buddy dialog, such as in buddy dialog 118 or 126. Each buddy dialog is represented by a class, which is code to handle the user actions of the buddy dialog. In the example of FIG. 2, buddy dialog 118 is managed by the code of Table 2. In the example of FIG. 3, buddy dialog 126 is managed by the code of Table 3.

Referring to FIG. 2 and Table 2, in connection with Table 1, the procedure at Table 2 lines 910–927 (Tag B) is entered from Table 1 line 723 through line 806. This procedure validates, if required, data entered for a previously selected option. The procedure at Table 2 lines 928–991 (Tag A) is entered from Table 1 line 622, which passes the data object for this buddy dialog so that its values can be displayed, as previously described. In Table 2, the code at lines 922–1016 (Tag C1) respond to user activation of add button 164, the code at lines 1017–1054 (Tag C2) to user activation of move down button 170, the code at lines 1055–1092 (Tag C3) to activation of move up button 168, the code at lines 1093–1110 (Tag C4) to activation of remove button 166, and the code at lines 1111–1217 (Tags C5 and C6) to editing of IP addresses in edit block 162.

Referring to FIG. 3 and Table 3, the code at lines 1314–1358 responds to user entry of data in edit blocks 172, 174 of buddy dialog 126. In Table 3, the code at lines 1364–1381 corresponds (performs a similar function) to that of Table 2 lines 910–927 (Tag B), and the code at lines 1382–1426 corresponds (performs a similar function) to that of Table 2 lines 928–991 (Tag A).

In step 192, if the user (also referred to as the administrator) changed during step 190 (adds, deletes, modifies or reorders) any of the values in buddy dialog 118 or 126, these are saved in the current option object. In accordance with the preferred embodiment of the invention, step 192 is implemented by Table 1, lines 718–758. In step 192, which is the case where a new option is selected from option list 120 or 130, processing returns to step 184. This will trigger the saving of previously edited data fields 162, 172 for this buddy dialog, or the like before the selecting and displaying of a new buddy dialog type in steps 184 and 186.

In steps 194, 196, in the case where OK button 112 is selected or another property page selected by clicking one of tabs 152–155, option page 158 is closed. (Again, this selection of OK button 112 or of another property page 152–155 may trigger the saving of data values in step 190. If it is desired not to save changes to data values 162, the user may select cancel button 114.) Step 194 is, in the preferred embodiment, executed by Table 1 lines 814–829.

As previously noted, different buddy dialogs may be provided for each of a plurality of option data formats or types. FIG. 2 illustrates and Table 2 executes control of a buddy dialog for an ordered IP address list. FIG. 3 illustrates and Table 3 executes control of a buddy dialog for a time value. Other data formats for which buddy dialogs may be provided include, for example, blank, alphanumeric, numeric, IP address list, time offset, boolean, IP address pairs, choice, and user defined formats.

TABLE 1

```
//
//
//   File:
//         undhpoptionspage.cpp   : implementation of the
//                                  CDHCPOptionsPage class
//
//   Class Name:
//   CDHCPOptionsPage
//
//   Purpose:
//   Handle DHCP Options property page
//
. . .
void CDHCPOptionsPage: :DoDataExchange (CDataExchange* pDX)
{
. . .
        DDX_Control(pDX, IDC_LIST_DHCPOPT_AVAILABLE_OPTIONS,
             m_listAvailable) ;
. . .
        DDX_Control(pDX, IDC_LIST_DHCPOPT_SELECTED_OPTIONS,
             m_listSelected) ;
{
. . .
BOOL CDHCPOptionsPage: :OnSetActive()
{
        // set edit box to be empty since nothing is selected
        ChangeEditView(NULL, NULL) ;
        m_bViewsCreated = TRUE;
. . .
}
. . .
void CDHCPOptionsPage: :ChangeEditView (CDHCPDmOptionTemplate*
     pTemplate, CDHCPDmOption* pOption)
{
        BOOL rc;
        RECT rect;
        CDHCPDmOptionTemplate: :eFormat eType;
        UpdateData(TRUE);
        if (m_pFrameWnd)
        {
        // call IsOkToKillFocusOnEditView so that any
        // changes will be saved in current option
             IsOkToKillFocusOnEditView();
             m_pFramewnd->DestroyWindow();
             m_pFrameWnd = NULL;
        }
        // figure out what edit view to put up
        if (pTemplate)
             eType = pTemplate->GetValueFormat();
        else
             eType = CDHCPDmOptionTemplate: :NONE;
        switch (eType)
        {
        case CDHCPDmOptionTemplate: :NONE:
             m_pFrameWnd = new CDHCpOptionsFrameWnd
                  (RUNTIME_CLASS (CDHCPOptionsEditBlank));
             break;
        case CDHCPDmOptionTemplate: :ALPHANUMERIC:
        case CDHCPDmOptionTemplate: :IPADDRESS:
             m_pFramewnd = new CDHCPOptionsFrameWnd
                  (RUNTIME_CLASS (CDHCPOptionsEditAlphanumeric));
             break;
        case CDHCPDmOptionTemplate: :NUMERIC:
             m_pFrameWnd = new CDHCPOptionsFrameWnd
                  (RUNTIME_CLASS (CDHCpOptionsEditNumeric));
             break;
        case CDHCPDmOptionTemplate: :ENTRYLIST:
             m_pFramewnd = new CDHcPOptionsFrameWnd
                  (RUNTIME_CLASS (CDHCPOptionsEditIpAddressList));
```

TABLE 1-continued

```
              break;
        case CDHCPDmOptionTemplate: :ORDEREDIPADDRESSLIST:
              m_pFrameWnd = new CDHCPOptionsFrameWnd
                    (RUNTIME_CLASS (CDHCPOptionsEditOrderedIPAddressList));
              break;
        case CDHCPDmOptionTemplate: :TIME:
              m_pFrameWnd = new CDHCPOptionsFrameWnd
                    (RUNTIME_CLASS (CDHCPOptionsEditTimeValue));
              break;
        case CDHCPDmOptionTemplate: :TIMEOFFSET:
              m_pFrameWnd = new CDHCPOptionsFrameWnd
                    (RUNTIME_CLASS (CDHCPOptionsEditTimeOffset));
              break;
        case CDHCPDmOptionTemplate: :BOOLEAN:
              m_pFrameWnd = new CDHCPOptionsFrameWnd
                    (RUNTIME_CLASS (CDHCPOptionsEditBoolean));
              break;
        case CDHCPDmOptionTemplate: :IPADDRESSPAIRLIST:
              m_pFrameWnd = new CDHCPOptionsFrameWnd
                    (RUNTIME_CLASS (CDHCPOptionsEditIPAddressPairs));
              break;
        case CDHCpDmOptionTemplate: :CHOICE:
              m_pFrameWnd = new CDHCPOptionsFrameWnd
                    (RUNTIME_CLASS(CDHCpOptionsEditChoice));
              break;
        case CDHCpDmOptionTemplate: :USERDEFINED:
              m_pFrameWnd = new CDHCPOptionsFrameWnd
                    (RUNTIME_CLASS (CDHCpOptionsEditUserDefined));
              break;
...
        // frame window for the editing view
        // note: in_butEditGroupBox is a hidden group box on
        // the dialog so we get an appropriate size
        m butEditGroupBox.GetwindowRect (&rect);
        ScreenToClient (&rect);
        DWORD style = WS CHILD | WS_VISIBLE;
        // if we don't have an option, disable the view
        if (!pOption)
              style | WS_DISABLED;
        else
              style | = WS_TABSTOP;
        rc = m_pFramewnd->Create(NULL,"",
                                        style,
                                        CRect (rect.left,
                                        rect. top,
                                        rect.right,
                                        rect.bottom),
                                        this) ;
...
        // pass the option and template to the view
        m_pFrameWnd->Getview()->Setoption(pOption, pTemplate);
        // set up the option tag, name, and description fields
        // on the page
        if (pTemplate)
        {
              m_strCurrentOptionName.Format
                    (IDS_DHCPOPTIONPAGE_NAMEFIELD,
              pTemplate->GetTag(),
              pTemplate->GetName ());
              m_editOptionDescription.SetWindowText
                    (pTemplate->GetDescription());
        }
        else
        {
              m_strCurrentOptionName.Empty();
              n_editOptionDescription.SetWindowText(_T(""));
        }
        UpdateData(FALSE);
}
void CDHCPOptionsPage::
        OnItemChangedListDhcpoptAvailableOptions
        (NMHDR* pNMHDR, LRESULT* pResult)
{
        int i;
        NM_LISTVIEW* pNMListView = (NM_LISTVIEW*)pNMHDR;
        if (!IsOkToKillFocusOnEditView())
        {
              m_pFrameWnd->SetFocus();
              return;
```

TABLE 1-continued

```
        }
        CDHCPDmOptionTemplate* pPrevsel =
            m_pCurrentAvailableoptionTemplate;
        m_pCurrentAvailableOptionTemplate = NULL;
        for (i = 0; i < m_listAvailable.GetItemcount(); i++)
        {
            if (m_listAvailable.GetItemState(i, LVIS_SELECTED)
                & LVIS_SELECTED)
            {
                m_pCurrentAvailableOptionTemplate =
                CDHCPDmOptionTemplate*)
                 m_listAvailable.GetItemData (i);
                break;
            }
        }
        // only set focus if a new item is selected, otherwise
        // we get an infinite loop
        if (m_pCurrentAvailableOptionTemplate  != pPrevSel)
        {
            if (m_pCurrentAvailableOptionTemplate)
                m_listAvailable.SetItemState (i,
                LVIS_FOCUSED, LVIS_FOCUSED);
            // show the right thing in the edit view
            ChangeEditview (m_pCurrentAvailableOptionTemplate,
             NULL)
            // since the user can't edit the option value, set
            // focus back to the list
            m_pFrameWnd->EnableWindow(FALSE);
            m_listAvailable.SetFocus();
        }
        m_butAdd.EnableWindow(m_pCurrentAvailableOptionTemplate
         != NULL);
        *pResult = 0;
}
void CDHCpOptionsPage::
    OnSetfocusListDhcpoptAvailableOptions
    (NMHDR* pNMHDR, LRESULT* pResult)
{
        if (!m_bInAdd && !IsOkToKillFocusOnEditView())
        {
            if  (!m_bPostedMsgInOnSetFocus)
            {
                m_bPostedMsgInOnSetFocus = TRUE;
                m_pFrameWnd->GetView()->PostError();
            }
            m_bPostedMsgInOnSetFocus = FALSE;
            m_listAvailable.PostNessage(WN_CANCELMODE);
            m_pFramewnd->SetFocus();
            *pResult = 0;
            return;
        }
        m_bPostedMsgInOnSetFocus = FALSE;
        if (m_eListFocus  != AVAILFOCUS)
        {
            m_eListFocus = AVAILFOCUS;
            // we might not have gotten here by a mouse click
            SelectListItem(m_listAvailable);
            ChangeEditView (m_pCurrentAvailableOptionTemplate,
            NULL)
            m_butAdd.EnableWindow
            (m_pCurrentAvailableOptionTemplate  != NULL);
            m_butRemove.EnableWindow (FALSE);
        }
        *pResult = 0;
}
void CDHCPOptionsPage::
    OnItemchangedListDhcpoptSelectedOptions
    (NMHDR* pNNHDR, LRESULT* pResult)
{
        NM_LISTVIEW* pNMListView = (NN_LISTVIEW*)PNMHDR;
        if (!IsOkToKillFocusOnEditView())
        {
            m_pFrameWnd->SetFocus();
            *pResult = 0;
            return;
        }
        m_pCurrentSelectedOption = NULL;
        for (int i = 0; i < m_listSelected.GetItemcount(); i++)
        {
```

TABLE 1-continued

```
            if (m_listSelected.GetItemState (i, LVIS_SELECTED)
              & LVIS_SELECTED)
            {
                m_pCurrentSelectedOption =
                  (CDHCPDmOption*)
                  m_listSelected.GetItemData(i);
                break;
            }
        }
        // show the right thing in the edit view
        if (m_pCurrentSelectedOption)
        {
            ChangeEditView(m_pConfiguration->
              GetOptionTemplate (m_pCurrentSelectedOption->
              GetTag()),
              m_pCurrentSelectedOption);
            m_butRemove.EnableWindow(TRUE);
        }
        else
        {
            ChangeEditView(NULL, NULL);
            m_butRemove.EnableWindow(FALSE);
        }
        //m_listSelected.SetFocus();
        *pResult = 0;
}
...
BOOL CDHCPOptionsPage: :IsOkToKillFocusOnEditView ()
{
        if (m_pFramewnd && m_pFramewnd->Getview())
            return m_pFramewnd->GetView() ->IsOkToClose ();
        else
            return TRUE;
}
//
//  Validate this page when we switch to another page in the
//  sheet
//
BOOL CDHCPOptionsPage: :OnKillActive ()
{
        BOOL bPropPgRc = CPropertyPage::OnKillActive();
        BOOL bIsValidPage = IsValidPage();
        if ((bPropPgRc) && (bIsValidPage))
        {
            if (m_pFrameWnd)
            {
                m_pFrameWnd->DestroyWindow();
                m_pFrameWnd = 0;
            }
            return TRUE;
        }
        else
            return FALSE;
}
BOOL CDHCPOptionsPage: : IsValidPage ()
{
        if (! IsOkToKillFocusOnEditView ())
        {
            m_pFrameWnd->Getview() ->PostError();
            return FALSE;
        }
...
}
```

TABLE 2

---
OPTIONS EDIT ORDERED IP ADDRESS LIST BUDDY DIALOG
---

```
//
//
//  File:
//    undhpoptionseditorderedipaddresslist .cpp
//
//  Class Name:
//    cdhcpoptionseditorderedipaddresslist
```

TABLE 2-continued

```
//
//
...
//
//    TAG B   From Table 1   line 723 through line 806
//
//
//    CDHCPOptionsEditOrderedlpAddressList message handlers
//
BOOL CDHCPOptionsEditOrderedIPAddressList: : IsOkToClose ()
{
        if  (!m_pOption)
            return TRUE;
        if  (m_listSingleEntries.GetSafeHwnd())
            UpdateData (TRUE);
        unsigned failingItem;
        m_eDHCPError = m_pOption->
            Validate(failingItem, m_stat);
        // always return TRUE so user can look at other options
        return TRUE;
}
//
// TAG A1 SetOption is called from Table 1 line 622
//
void CDHCPOptionsEditOrderedIPAddressList::
    SetOption (CDHCPDmOption* pOption,
    CDHCPDmOptionTemplate* pTemplate)
{
        // first the parent class version of this method
        CDHCPOptionsEditView: :SetOption(pOption, pTemplate);
        if  (m_pTemplate)
        {
            CString strLabel;
            strLabel = m_pTemplate->GetFormatLabels();
            while (m_listSingleEntries.DeleteColumn(0));
            RECT rect;
            m_listSingleEntries.GetClientRect(&rect);
            n_listSingleEntries.InsertColumn(0, strLabel,
                LVCFMT_LEFT, rect.right-rect.left);
        }
        else
        {
            ASSERT(FALSE);
            // this shouldn't be called without a template
        }
        m_listSingleEntries.DeleteAllItems();
        if  (m_pOption)
        {
            m_butAdd.EnableWindow(TRUE);
            m_butRemove.EnableWindow(FALSE);
            m_butMoveup.EnableWindow(FALSE);
            m_butMoveDown.EnableWindow(FALSE);
            CString optionEntries = m_pOption->Getvalue();
            CString curEntry;
            int index = optionEntries.Find(_T(" "));
            while (index != (-1))
            {
                curEntry = optionEntries.Left(index);
                if   (!curEntry.IsEmpty())
                    m_listSingleEntries.InsertItem
                    (m_listSingleEntries.GetItemCount (),
                    curEntry);
                optionEntries = optionEntries.Right
                    (optionEntries.GetLength () -index-1);
                optionEntries.TrimLeft();
                index = optionEntries.Find(_T(" "));
            }
            if (!optionEntries.IsEmpty()) // one more to add
                m_listSingleEntries.InsertItem
                (m_listSingleEntries.GetItemCount(),
                    optionEntries);
            if (m_listSingleEntries.GetItemCount() >0)
                m_listSingleEntries.SetItemState (0,
                    LVIS_FOCUSED, LVIS_FOCUSED) ;
        }
        else
        {
            m_butAdd.EnableWindow(FALSE);
            m_butRemove.EnableWindow(FALSE);
```

TABLE 2-continued

```
            m_butMoveUp.EnableWindow(FALSE);
            m_butMoveDown.EnableWindow (FALSE);
        }
        if (m_listSingleEntries.GetSafeHwnd()
            UpdateData (FALSE);
}
//
// TAG C1
//
void CDHCPOptionsEditOrderedIPAddressList::
 OnButtonDhcpoptChildSingleOrderedEntryAdd ()
{
        int index;
        CString strEntry = _T("");
        UpdateData (TRUE);
        index = m_listSingleEntries.InsertItem
            (m_listSingleEntries.GetItemCount(),
            strEntry);
        UnselectAllEntries ();
        m_listSingleEntries.SetItemState (index,
            LVIS_SELECTED | LVIS_FOCUSED,
            LVIS_SELECTED | LVIS_FOCUSED);
        m_listSingleEntries.EnsureVisible(index, FALSE);
        m_listSingleEntries.SetFocus ();
        m_butRemove.EnableWindow(TRUE);
        m_butMoveup.EnableWindow(TRUE);
        m_butMoveDown.EnableWindow(TRUE);
        UpdateData (FALSE);
        m_bAddingNewEntry = TRUE;
        m_listSingleEntries.EditLabel (index);
}
//
// TAG C2
//
void CDHCPOptionsEditOrderedIPAddressList::
 OnButtonDhcpoptChildSingleOrderedEntryMovedown ()
{
        int nItem;
        Cstring strEntry;
        // we should be guaranteed that one item is selected if
        // the remove button could be clicked
        for (nItem = 0; (!m_listSingleEntries.GetItemState
            (nItem, LVIS_SELECTED)) ; nItem++);
        // nItem should now be the item that is selected
        // Only move it if it's not the last item
        if (nItem < (m_listSingleEntries.GetItemcount()-1))
        {
            strEntry = m_listSingleEntries.GetItemText
                (nItem, 0);
            m_listSingleEntries.DeleteItem(nItem);
            nItem = m_listSingleEntries.InsertItem
                (nItem+1, strEntry);
            m_listSingleEntries.Ensurevisible(nItem, FALSE);
            UnselectAllEntries();
            m_listSingleEntries.SetItemState
                (nItem, LVIS_SELECTED | LVIS_FOCUSED,
                    LVIS_SELECTED | LVIS_FOCUSED);
        m_listSingleEntries.EnsureVisible(nItem, FALSE);
        }
        else
        }
            UnselectAllEntries ();
            m_listSingleEntries.SetItemState
                (nItem, LVIS_SELECTED | LVIS_FOCUSED,
                        LVIS_SELECTED | LVIS_FOCUSED);
        }
        m_listSingleEntries.SetFocus();
        UpdateData (FALSE);
}
//
// TAG C3
//
void CDHCPOptionsEditOrderedIPAddressList::
 OnButtonDhcpoptChildSingleOrderedEntryMoveup ()
{
        int nItem;
        CString strEntry;
        // we should be guaranteed that one item is selected
        // if the remove button could be clicked
```

TABLE 2-continued

```
            for (nItem = 0; (!m_listSingleEntries.GetItemstate
                (nItem, LVIS_SELECTED)) ; nItem++);
        // nItem should now be the item that is selected
        // Only move it if it's not the last item
        if (nItem > 0)
        {
            strEntry = m listSingleEntries.GetItemText
                (nItem, 0);
            m_listSingleEntries.DeleteItem(nItem);
            nItem = m_listSingleEntries.InsertItem
                (nItem-1, strEntry);
            m_listSingleEntries.EnsureVisible (nItem, FALSE);
            UnselectAllEntries ();
            m_listSingleEntries.SetItemstate (nItem,
                LVIS_SELECTED | LVIS_FOCUSED,
                LVIS_SELECTED | LVIS_FOCUSED);
            m_listSingleEntries.EnsureVisible(nItem, FALSE);
        }
        else
        {
            UnselectAllEntries ();
            m_listSingleEntries.SetItemState
                (nItem, LVIS_SELECTED | LVIS_FOCUSED,
                    LVIS_SELECTED | LVIS_FOCUSED);
        }
        m_listSingleEntries.SetFocus();
        UPdateData(FALSE);
}
//
// TAG C4
//
void CDHCpOptionsEditOrderedIPAddressList::
OnButtonDhcpoptChildSingleOrderedEntryRemove ()
{
        int nItem;
        // we should be guaranteed that one item is selected
        // if the remove button could be clicked
        for (nItem = 0; (!m_listSingleEntries.GetItemState
            (nItem, LVIS_SELECTED)) ; nItem++);
            // nItem should now be the item that is selected
            m_listSingleEntries.DeleteItem(nItem);
        // now no item has selection
        m_butRemove.EnableWindow (FALSE);
        rrt_butMoveUp.EnableWindow(FALSE);
        m_butMoveDown.EnableWindow (FALSE);
}
//
// TAG C5
//
void CDHCPOptionsEditOrderedIPAddressList::
    OnItemchangedListDhcpoptChildSingleOrderedEntry
    (NMHDR* pNMHDR, LRESULT* pResult)
{
        NM_LISTVIEW* pNMListView = (NM_LISTVIEW*)pNMHDR;
        if (m_listSingleEntries.GetSelectedCount())
        {
            m_butRemove.EnableWindow(TRUE);
            m_butMoveup.EnableWindow(TRUE);
            m_butMoveDown.EnableWindow (TRUE);
        }
        else
        {
            m_butRemove.EnableWindow(FALSE);
            m_butMoveUp.EnableWindow (FALSE);
            m_butMoveDown.EnableWindow(FALSE);
        }
        *pResult = 0;
}
void CDHCPOptionsEditOrderedIPAddressList::
    OnEndlabeleditListDhcpoptChildSingleOrderedEntry
    (NNHDR* PNMHDR, LRESULT* pResult)
{
        LV_DISPINFO* pDispInfo = (LV_DISPINFO*)PNMHDR;
        LV_ITEM lvItem = pDispInfo->item;
        // If user did not press esc while editing item
        if( lvItem.pszText  != NULL )
        {
            // Process the string from the list's edit control
            CString newItem;
```

TABLE 2-continued

```
                CEdit* pEditCtrl =
                    m_listsingleEntries.GetEditControl ();
                pEditCtrl->GetWindowText (newItem);
                // validate that the new Item is a valid
                CBaseTCPIPAddress::STAT rcl;
                EDHCPError rc = m_pOption->
                ValidateSingleItem(newItem, rcl);
                if (rc != DHCP OK) // pops up a message if invalid
                {
                    AfxMessageBox(CDHCPDmError::
                      GetMessage (rc, rcl),
                      MB_OK I MB_ICONEXCLAMATION);
                    // place the user back in the edit box, while
                    // remembering the old value in case they
                    // cancel the edit next time
                    Cstring oldItem =
                    m_listSingleEntries.GetItemText
                        (lvItem.iItem, 0) ;
                    m_listSingleEntries.SetItemText
                        (lvItem.iItem, 0, newItem);
                    m_listSingleEntries.SetFocus();
                    m_listSingleEntries.EditLabel(lvItem.iItem);
                    m_listSingleEntries.SetItemText
                        (lvItem.iItem, 0, oldItem);
                }
                else
                {
                    m_listSingleEntries.SetItemText
                        (lvItem.iItem, 0, newItem);
                    m_bAddingNewEntry = FALSE;
                }
                *pResult = 0;
            }
            // If user pressed esc while adding a new entry,
            // remove it from the list.
            else if (m_bAddingNewEntry)
            {
                m_listSingleEntries.DeleteItem(lvItem.iItem);
                if (m_listSingleEntries.GetSelectedCount ())
                {
                    m_butRemove.EnableWindow(TRUE);
                    m_butMoveUp.EnableWindow(TRUE);
                    m_butMoveDown.EnableWindow(TRUE);
                }
                else
                {
                    m_butRemove.EnableWindow(FALSE);
                    m_butMoveUp.EnableWindow(FALSE);
                    m_butMoveDown.EnableWindow(FALSE);
                }
                m_bAddingNewEntry = FALSE;
                UpdateData(FALSE);
            }
            m_iCurrentEditItem = -1;
            *pResult = 0;
}
//
// TAG C6
//
void CDHcPOptionsEditOrderedIPAddressList::
OnBeginlabeleditListDhcpoptChildSingleOrderedEntry
    (NMHDR* pNMHDR, LRESULT* pResult)
{
        LV_DISPINFO* pDispInfo = (LV_DISPINFO*)PNMHDR;
        LV_ITEM lvItem = pDispInfo->item;
        m_iCurrentEditItem = lvItem.iItem;
        CEdit* pEdit = m_listSingleEntries.GetEditControl();
        ASSERT (pEdit);
        pEdit->SetLimitText (m_pTemplate->
            GetValueLengthLimit ());
        *pResult = 0;
}
```

TABLE 3

OPTIONS EDIT TIME VALUE BUDDY DIALOG

```
//
//
//
// File:
//
//    undhpoptionsedittimevalue.cpp
//
//
//    Class Name:
//
//    cdhcpoptionsedittimevalue
//
//
//
//
//    TAG F
//
void CDHCPOptionsEditTimeValue::
 DoDataExchange (CDataExchange* pDX)
{
    CDHCPOptionsEditView: :DoDataExchange (pDX);
    // {{AFX_DATA_MAP (CDHCPOptionsEditTimeValue)
    DDX_Control(pDX, IDC_STATIC_OPTIONSEDIT_TIMELABEL,
       m_staticLabel) ;
    DDX_Control(pDX, IDC_DROP_OPTIONEDIT_TIMEUNITS,
       m_dropUnits) ;
    DDX_Text(pDX, IDC_EDIT_OPTIONEDIT_TIMELENGTH,
       m_strTime) ;
    DDX_Text(pDX, IDC_STATIC OPTIONSEDIT_TIMELABEL,
       m_strLabel) ;
    // }}AFX_DATA_MAP
    if (pDX->m_bSaveAndValidate)   // from dialog to option
                            // object
    {
        if (m_pOption)
        {
            CString optionValue;
            if (::DHCPIsUnsignedLongDecimalInteger
                (m_strTime))
                }
            CDHCPDmTimeInterval
                ti(m_strTime,
                (eTimeUnits)m_dropUnits.GetCurSel());
            if (ti.IsValid())
                optionValue.Format(_T("%u"),
                ti.GetTotalSeconds ());
            else
                optionValue.Format(_T
                ("9999999999999999")) ;
                // something invalid
        }
        else
            optionValue.Format(_T
            ("9999999999999999")) ;
            // something invalid
        m_pOption->SetValue(optionValue);
        }
    }
}
//
// TAG E
//
// CDHCPOptionsEditTimeValue message handlers
//
BOOL CDHCPOptionsEditTimeValue: :IsOkToClose()
{
    // if we don't have an option, or we haven't been
    // initialized, just say it's ok
    if (!m_pOption || !m_staticLabel.GetSafeHwnd())
       return TRUE;
    UpdateData (TRUE);
    unsigned failingItem;
    m_eDHCPError = m_pOption->
       Validate(failingItem, m_stat);
    // Determine if this option has at least a valid time
    // value
```

TABLE 3-continued

```
    CString optionValue;
    CDHCPDmTimeInterval ti(m_strTime,
      (eTimeUnits)m_dropUnits.GetCurSel ());
    return TRUE;  // ok to leave
}
//
// TAG D
//
void CDHCPOptionsEditTimeValue::
 SetOption (CDHCPDmOption* pOption,
 CDHCPDmOptionTemplate* pTemplate)
{
    // first the parent class version of this method . . .
    CDHCPOptionsEditView: :SetOption(pOption, pTemplate);
    // now, fill in the possible time units
    CString unitLabel;
    for (int i = IDS_DHCP_TIMEUNIT_SECONDS;
      i <= IDS_DHCP_TIMEUNIT_YEARS; i++)
    {
        unitLabel.LoadString(i);
        m_dropUnits.AddString(unitLabel);
    }
    m_dropUnits.SetCurSel(0);
    if (m_pTemplate)
        m_strLabel.Format(_T("%s:"),
        m_pTemplate->GetFromatLabels ());
    else
        m_strLabel = _T("");
    if  (m_pOption)
    {
        CDHCPDmTimeInterval ti
            m_pOption->GetValue(),  DHCP_SECONDS);
        eTimeUnits units;
        if (ti.IsValid())
        {
            ti.GetNormalized(m_strTime,  units);
            m_dropUnits.SetCurSel (units);
        }
        // set the limits on the length of the size of
        // our edit box
        CEdit* pEdit = (CEdit*)GetDlgItem
          (IDC_EDIT_OPTIONEDIT_TIMELENGTH);
        ASSERT (pEdit);
        pEdit->SetLimitText (pTemplate->
            GetValueLengthLimit());
    }
    if  (m staticLabel.GetSafeHwnd())
        UpdateData(FALSE);
}
// where :: is the C++ scope resolution operator. The class
// is specified on left of the ::, and to the right is the
// method within the class.
//
// where -> used in C++ for referencing fields or methods
// within an object. Whereas a dot asks for the value, the
// right arrow asks for the pointer to the method.
```

Advantages over the Prior Art

It is an advantage of the invention that there is provided an improved graphical user interface for enabling a user to configure objects.

It is an advantage of the invention that there is provided for user-interface developers, such as server configuration tool developers, the capability to provide users with an improved GUI enabling a user to view and edit values of objects with different value formats.

It is an advantage of the invention that there is provided an improved GUI which enables object configuration without relying solely on the use of pop-up dialogs.

It is an advantage of the invention that there is provided an object configuration GUI in which no extra dialogs appear to distract the user, hide information, and possibly require user interaction to close.

It is an advantage of the invention that there is provided an improved GUI which allows a user to quickly view current settings of a collection of objects with different formats.

Alternative Embodiments

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Accordingly, the scope of protection of this invention is limited only by the following claims and their equivalents.

We claim:

1. A method for presenting a graphical user interface including a buddy dialog which is part of a current dialog, comprising the steps of:

responsive to user selection of a first property page in said current dialog, displaying said first property page including a plurality of N selectable objects having M data type formats for their attributes, with M<N, and a buddy dialog, a buddy dialog being a reserved area including a dynamic part of said current dialog for dynamically presenting a complex set of controls providing component definitions corresponding to a data type format of a selected object, data in which can be directly selected and edited;

responsive to user selection of a first selectable object, dynamically selecting a first buddy dialog having a component definition corresponding to the data type of said first selectable object, and displaying said first buddy dialog in said reserved area.

2. A system for presenting a graphical user interface including a buddy dialog which is part of a current dialog, comprising:

a display;

a first code module for displaying said current dialog at said display, said current dialog including a selectable first property page;

a second code module responsive to user selection of said first property page for displaying at said display said first property page including a plurality N selectable objects and a reserved area for one of M buddy dialogs, with M<N, for providing a component definition responsive to a data type of a selected object, data in which component definition can be directly selected and edited;

a third code module responsive to user selection of a first selectable object for dynamically selecting a first buddy dialog including a complex set of controls and having a component definition corresponding to the data type of said first selectable object, and displaying said first buddy dialog in said reserved area.

3. A program storage device readable by a machine, tangibly embodying a program of instructions executable by a machine to perform method steps for presenting a graphical user interface at a display, said method steps comprising:

responsive to user selection of a first of N possible property pages in said current dialog, displaying said first property page including at least one selectable object and a reserved area for a buddy dialog including a complex set of controls for displaying within a reserved area, which upon selection becomes a dynamic part of said current dialog, component definitions dynamically configured based upon a data type of a selected object, data in which said buddy dialog can be is directly selected and edited;

responsive to user selection of a first selectable object, selecting a first of M buddy dialogs, with M<N, having a component definition corresponding to the data type of said first selectable object, and displaying said first buddy dialog in said reserved area.

4. An article of manufacture comprising:

a computer useable medium having computer readable program code means embodied therein for presenting a graphical user interface at a display, the computer readable program means in said article of manufacture comprising:

computer readable program code means for causing a computer to effect, responsive to user selection of a first of N property pages in said current dialog, displaying said first property page including at least one selectable object and a reserved area for one of M buddy dialogs, with M<N, said buddy dialog being a reserved area which upon selection of said selectable object becomes a dynamic part of said current dialog for dynamically displaying a complex set of controls and component definitions based upon a data type of a selected object, data in which can be directly selected and edited;

computer readable program code means for causing a computer to effect, responsive to user selection of a first selectable object, dynamically selecting a first buddy dialog having a component definition corresponding to the data type of said first selectable object, and displaying said first buddy dialog in said reserved area.

5. Method for displaying and managing a graphical user interface, comprising the steps of:

displaying a property page, said property page including a reserved area; and responsive to user selection of a first option, of N selectable options having M different data types, with M<N, within said property page, displaying within said reserved area a buddy dialog, a buddy dialog being a reserved area which upon selection becomes a dynamic part of said current dialog for providing a a complex set of controls and component definition dynamically corresponding to a data type corresponding to said first option, data in which can be directly selected and edited.

6. The method of claim 5, comprising the further step of selecting for display within said reserved area a buddy dialog corresponding to the data format of said option.

7. The method of claim 6, comprising the further step of providing a plurality of buddy dialogs, each corresponding to a different data format of a selectable option.

8. The method of claim 6, comprising the further steps of:

responsive to user selection of a second option subsequent to selection of a first option within said property page, saving data values for a current buddy dialog to said first option and selecting and displaying a new buddy dialog corresponding to the data format of said second option.

9. The method of claim 8, wherein said new buddy dialog is displayed within said reserved area.

10. The method of claim 6, comprising the further steps of:

responsive to user selection of an OK button within said property page of committing data values for said property page including said buddy dialog.

11. The method of claim 6 wherein said user is enabled to interact directly with both said property page and its included buddy dialog.

12. An article of manufacture comprising:

a computer useable medium having computer readable program code means embodied therein for presenting a graphical user interface at a display, the computer readable program means in said article of manufacture comprising:

computer readable program code means for causing a computer to effect displaying a property page or other dialog, said property page or other dialog including a reserved area;

computer readable program code means for causing a computer to effect, responsive to user selection of one of N options within said property page or other dialog, displaying within said reserved area one of M unique buddy dialogs, with M<N, a buddy dialog being a reserved area for displaying a complex set of controls and component definitions dynamically responsive to a data type of a selected option and which upon selection becomes a dynamic part of said property page or other dialog, data in which can be directly selected and edited;

computer readable program code means for causing a computer to effect selecting for display within said reserved area a buddy dialog having a first component definition corresponding to the data format of said option; and computer readable program code means for causing a computer to effect, responsive to user selection of a second option subsequent to selection of a first option within said property page or other dialog, saving data values for a current buddy dialog to said first option and selecting and displaying a new buddy dialog having a second, unique component definition corresponding to the data format of said second option.

13. A program storage device readable by a machine, tangibly embodying a program of instructions executable by a machine to perform method steps for presenting a graphical user interface at a display, said method steps comprising:

displaying a current dialog, said current dialog including a reserved area;

responsive to user selection of one of N options within said current dialog, displaying within said reserved area one of M buddy dialogs, with M<N, a buddy dialog being a reserved area which upon selection becomes a dynamic part of said current dialog including a complex set of controls, data in which can be directly selected and edited;

selecting for display within said reserved area a buddy dialog having a first component definition dynamically corresponding to the data format of said option; and responsive to user selection of a second option subsequent to selection of a first option within said current dialog, saving data values for a current buddy dialog to said first option and selecting and displaying a new buddy dialog having a second component definition dynamically corresponding to the data format of said second option.

14. System for presenting a graphical user interface at a display, comprising:

means for displaying a property page, said property page including a reserved area;

means responsive to user selection of a first of N possible options within said property page for displaying within said reserved area a buddy dialog, a buddy dialog being a reserved area, which upon selection becomes a dynamic part of said property page, for displaying a complex set of controls and a corresponding first of M possible component definitions, with M<N, data in which can be directly selected and edited;

means for selecting for display within said reserved area a buddy dialog corresponding to the data format of said option; and means responsive to user selection of a second option subsequent to selection of a first option within said property page for saving data values for a current buddy dialog to said first option and selecting and displaying a new buddy dialog corresponding to the data format of said second option.

15. A display, comprising:

a current dialog; and a buddy dialog, s aid buddy dialog being a reserved area within said current dialog which upon selection becomes a dynamic part of said current dialog for providing a complex set of controls and one of M component definitions corresponding to a s elected user option from among a plurality of N options, where M<N, data in which buddy dialog being directly selectable and editable.

16. A method for operating a display, comprising the steps of:

displaying a current dialog; and responsive to selection of one of N options within said current dialog, displaying a corresponding one of M buddy dialogs, where M<N, a buddy dialog being a reserved area within said current dialog which upon selection becomes a dynamic part of said current dialog for presenting a complex set of controls and dynamically generating and displaying a component definition corresponding to a data type of a selected dialog, data in which can be directly selected and edited.

17. A program storage device readable by a machine, tangibly embodying a program of instructions executable by a machine to perform method steps for operating a display, said method steps comprising:

displaying a current dialog; and responsive to selection of one of N options within said current dialog, display one of M buddy dialogs, with M<N, a buddy dialog being a reserved area within said current dialog which upon selection becomes a dynamic part of said current dialog for dynamically generating and displaying a component definition corresponding to a data type of a selected dialog and a complex set of controls, data in which can be directly selected and edited.

* * * * *

UNITED STATES PATENT AND TRADEMARK OFFICE
CERTIFICATE OF CORRECTION

PATENT NO. : 6,310,632 B1
DATED : October 30, 2001
INVENTOR(S) : Tod A. Monroe and Eric A. Weinmann It is certified that error appears in the above-identified patent and that said Letters Patent is hereby corrected as shown below:

<u>Column 30,</u>
Line 19, please remove "s aid" and insert -- said --.
Line 23, please remove "s elected" and insert -- selected --.

Signed and Sealed this

Seventh Day of May, 2002

Attest:

Attesting Officer

JAMES E. ROGAN
*Director of the United States Patent and Trademark Office*